United States Patent [19]

King

[11] Patent Number: 4,862,009

[45] Date of Patent: Aug. 29, 1989

[54] COMBINED ELECTRIC STARTER AND ALTERNATOR SYSTEM USING A PERMANENT MAGNET SYNCHRONOUS MACHINE

[75] Inventor: Robert D. King, Schenectady, N.Y.

[73] Assignee: General Electric Company, Schenectady, N.Y.

[21] Appl. No.: 158,516

[22] Filed: Mar. 22, 1988

[51] Int. Cl.⁴ ............................................. F02N 11/04
[52] U.S. Cl. .......................................... 290/22; 290/31
[58] Field of Search ........................ 290/10, 22, 31, 46

[56] References Cited

U.S. PATENT DOCUMENTS

| | | | |
|---|---|---|---|
| 2,451,767 | 10/1948 | Nardone | 290/22 X |
| 2,466,427 | 4/1949 | Hoover | 290/31 X |
| 3,175,095 | 3/1965 | Denniston | 290/38 |
| 4,005,347 | 1/1977 | Erdman | 318/254 |
| 4,257,281 | 3/1981 | Bunger | 74/6 |
| 4,335,318 | 6/1982 | Mabuchi et al. | 290/31 |
| 4,456,830 | 6/1984 | Cronin | 290/27 |
| 4,464,576 | 8/1984 | Williams | 290/38 R |
| 4,473,752 | 9/1984 | Cronin | 290/38 R |
| 4,616,166 | 10/1986 | Cooper et al. | 290/31 X |

*Primary Examiner*—William M. Shoop, Jr.
*Assistant Examiner*—W. E. Duncanson, Jr.
*Attorney, Agent, or Firm*—Jill M. Breedlove; James C. Davis, Jr.; Marvin Snyder

[57] ABSTRACT

A system for cranking/starting a combustion engine and for generating electrical power during engine operation uses an inverter-driven, high efficiency permanent magnet synchronous machine as a cranking/starting motor during a start mode and as an alternator during a run mode. A modified planetary gear assembly provides sufficient torque multiplication during the start mode to enable the synchronous machine to start the engine. One-way clutches allow the planetary gear assembly to provide the torque multiplication in the start mode and 1:1 coupling between the engine crankshaft and the shaft of the synchronous machine after the engine has been started and is operating.

21 Claims, 4 Drawing Sheets

Fig. 1

(PRIOR ART)

COMBINED ELECTRIC STARTER AND ALTERNATOR SYSTEM USING A PERMANENT MAGNET SYNCHRONOUS MACHINE

BACKGROUND OF THE INVENTION

This invention relates to a starter system for an engine, such as an internal combustion engine or gas turbine jet engine. More particularly, the starter system includes a starter motor which functions as an alternating current (AC) generator once the engine has started.

The number of electrically driven accessories and actuators on motor vehicles and aircraft has been increasing. Electrical control of mirror positioning, electrical extension and retraction of antennas, and electrical latching of trunk lids are features which have been seen on some automobile designs within the last few years. Relatively high power levels have been required by some electrical features such as electrical positioning of the driver's seat, electrical heating of the driver's seat, electrical power steering, and future electrically-driven air conditioner compressors. Improved efficiency, reliability, weight reduction and diagnostic capability are design goals for motor vehicles and aircraft which increasingly use computer controls that facilitate such improvements. The increasing use of electrically driven accessories and actuators has resulted in greater requirements for on-board generation of electrical power.

A conventional internal combustion engine or gas turbine jet engine contains a direct current (DC) motor, which functions as a starter, and a separate DC generator or alternator. (As used herein, "generator" may signify either a DC or AC generator, an AC generator often being called an alternator.) The starter motor is typically powered from a battery through a high current, solenoid-operated switch. In order to provide the high torque necessary to start the engine turning, torque multiplication is achieved through a high ratio (typically 10:1 to 15:1) gear train. During automotive or other motor vehicle engine cranking, a small gear on the starter engages, via a Bendix drive, with a large gear mounted on the circumference of the engine flywheel. While the engine is running, the starter is mechanically disengaged from the flywheel and provides no useful function. A DC generator or an alternator (combined with an uncontrolled diode rectifier bridge and regulator) maintains the battery charge, which is depleted during starting of the engine, and supplies electrical power for on-board accessories while the engine is running.

Typically, motor vehicle alternators are driven from the engine crankshaft by a belt and pulley arrangement. The alternator operates at higher speed than the crankshaft to provide adequate voltage to maintain battery charge even when the engine runs at low idle speed. As engine speed increases, a regulator reduces the alternator field to maintain proper voltage for charging the battery. Conventional alternator efficiency is quite low, having a maximum of 55% to 60% which decreases to about 38% to 45% as the alternator speed and load increase to the maximum speed and rated load. Additional system losses, especially at high speed, result from alternator drive belt/pulley losses, alternator fan losses, and machine losses while operating at high frequencies.

The conventional system using a DC starter motor and alternator is disadvantageous for a number of reasons. The starter motor is not used except when the engine is being cranked/started, whereas the alternator is used only while the engine is running. The component which is not being used at a particular time simply increases the weight, size, and number of hardware components required to be carried by the vehicle. The requirement that the starter motor engage the flywheel during engine cranking/starting and disengage during engine operation introduces additional complexity into the system. Electric machine design, simplistic controls, and fan and belt/pulley losses of conventional starter and generator systems keep the efficiency relatively low. Additionally, the belt is subject to breakage or slip. Further, some prior starting and generating systems for aircraft or motor vehicles may use commutators, brushes, slip-rings, or other components which readily wear out.

SUMMARY OF THE INVENTION

Accordingly, it is a primary object of the present invention to provide a new and improved system for engine cranking/starting and for providing electrical power during engine operation.

Another object of the present invention is to provide a new and improved system for engine cranking/starting and for providing electrical power during engine operation, while avoiding or minimizing the disadvantages and problems of the conventional systems discussed above.

The above and other objects of the present invention which will become more apparent as the description proceeds are realized by an improved system for engine cranking/starting and for providing electrical power during engine operation. The system comprises an electronically commutated dynamolectric machine, preferably a permanent magnet machine that has very high efficiency. The machine has a shaft, a rotor mounted on the shaft, and a stator. A rotatable member, preferably a crankshaft, is adapted to be rotated by the machine during cranking/starting of the engine and rotated by the engine during engine operation. A gear assembly connects the shaft to the engine member.

The improved system of the invention is operable in both a start mode and a run mode. In the start mode, the rotor is rotated in a given direction during application of electrical energy to the stator such that the machine operates as a motor and drives the crankshaft by way of the gear assembly. The gear assembly contributes a gear ratio for torque multiplication. In the run mode, the crankshaft drives the rotor in the given direction by way of the gear assembly such that the machine operates as a generator with the stator supplying electrical power. The gear ratio contributed by the gear assembly is different than its gear ratio when in the start mode.

The gear assembly includes a plurality of gears. More specifically, a sun gear is coupled to the machine rotor and at least one planet gear (preferably several planet gears) mesh with the sun gear. A ring gear meshes with the planet gears and the gear assembly includes a planet carrier having a mount shaft upon which the plant gears rotate.

The gear assembly further includes a first clutch operable in the engine cranking/starting mode to hold the ring gear stationary relative to the machine housing and operable in the run mode to allow the ring gear to rotate relative to the machine housing. The gear assembly also includes a second clutch operable in the engine cranking/starting mode to allow rotation of the planet carrier relative to the ring gear and operable in the engine running mode to lock the ring gear to the planet carrier. Both of the first and second clutches are one-way clutches in that they freely allow rotation of one member relative to another member in a given direction, but automatically lock the two members together to prevent relative rotation of the one member relative to the other member in the opposite direction. The operation of the clutches causes the sun gear, planet gears, and ring gear to be locked together in the engine running mode such that the gear assembly provides a 1:1 gear ratio between the engine crankshaft and the shaft of the machine.

An inverter is powered by a battery in the engine cranking/starting mode to supply AC power to the machine. In the engine running mode, the machine operates as an AC generator to supply AC power to the inverter, which in turn supplies DC power to charge the battery. Solid-state starter/alternator controls (microprocessor based) provide appropriate commands to power semiconductors in the inverter to produce required torque during engine cranking/starting and proper voltage regulation of the battery during the engine running mode.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION OF THE INVENTION

Figure 1:
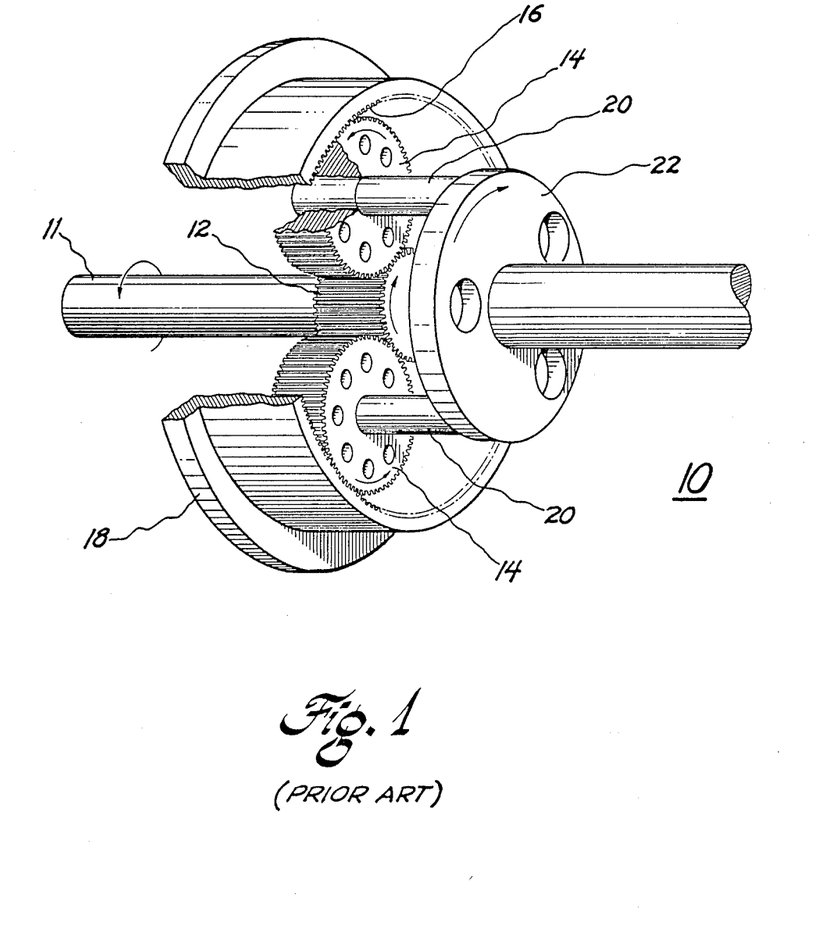
FIG. 1 is a view of a prior art and well-known planetary gear design.

A discussion of the commonly known prior art planetary gear set shown in FIG. 1 may be useful before proceeding to discuss the present invention. The planetary gear set 10 includes a rotating sun wheel or gear 12 being driven through a shaft 11. Direction of rotation of the gears is indicated by arrows. The gear 12 is shown rotating in a clockwise direction (as seen from the right side of FIG. 1) and causes counterclockwise rotation of the planet gears 14. Although only two planet gears 14 are visible in FIG. 1, the illustrated design includes three planet gears equiangularly spaced about sun gear 12. The planet gears 14 engage a ring gear 16 which is part of the internal surfaces of a fixed annulus 18. The engagement between planet gears 14 and the teeth of ring gear 16 causes planet gears 14 to "orbit" in a clockwise direction around the sun gear 12 in addition to rotating about their respective shafts 20. Shafts 20 (only two of which are visible in FIG. 1) rotatably support planet gears 14 upon a planet carrier 22. The "orbiting" of planet gears 14 about sun gear 12 causes clockwise rotation of planet carrier 22. Alternatively, rotation of planet carrier 22 can be used to rotate sun wheel 12 if one desires to transmit power in the opposite direction.

Figure 2:
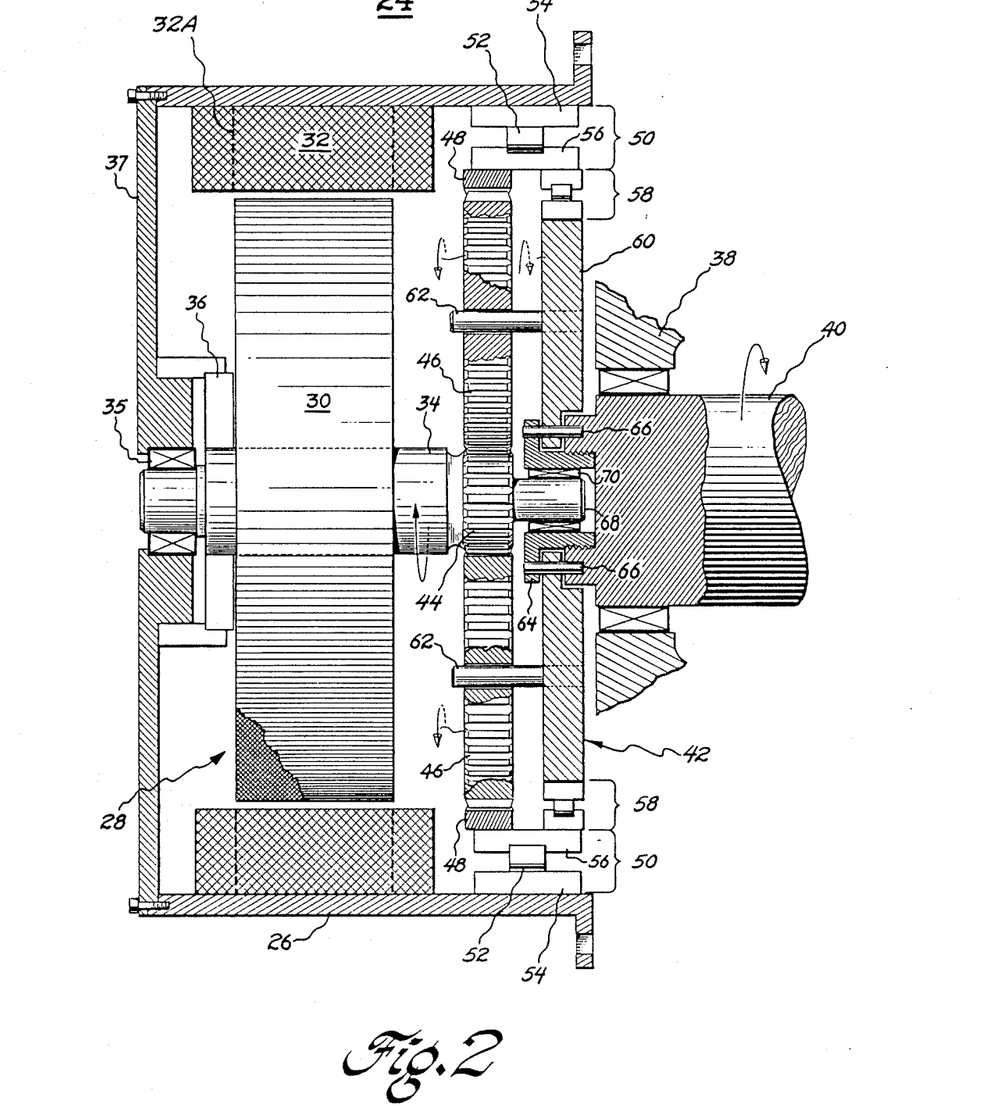
FIG. 2 is a side view, partially in cross section, illustrating a permanent magnet synchronous machine and planetary gear assembly connected to drive an engine crank-shaft according to the present invention, the engine and crankshaft being shown in fragmentary section.

FIG. 2 shows the mechanical components of a system 24 for engine cranking/starting and for providing electrical power during engine operation according to the present invention. The system includes a starter/alternator frame or housing 26 in which a permanent magnet synchronous dynamolectric machine 28 is disposed. Machine 28 may, in the alternative, comprise an induction machine or switched reluctance machine. The machine includes a rotor 30, stator 32 comprised of windings on a laminated core 32A whose edges are designated by dashed lines, and shaft 34. A rotor position transducer 36 is mounted as shown at one end of shaft 34 internally of bearings 35 mounted on end plate 37. Transducer 36 may be an analog resolver, encoder, or electrically derived signal.

Permanent magnet synchronous machine 28 serves as a cranking/starter motor for an engine having engine block 38 and engine crankshaft 40. The engine need not be described in detail as it may be a conventional internal combustion engine or gas turbine jet engine. Basically, permanent magnet synchronous machine 28 causes rotation of crankshaft 40 during the engine cranking/starting mode, whereas engine crankshaft 40 drives permanent magnet machine 28 as an alternator when the engine is running.

Situated between permanent magnet machine 28 and engine crankshaft 40 is a modified planetary gear assembly 42. A sun wheel or sun gear 44 is mounted upon shaft 34. The teeth of sun gear 44 mesh with planet gears 46. At least one planet gear is required, but it is highly preferable and more advantageous to include a plurality of planet gears 46 circumferentially spaced at equal angular intervals. In the example of FIG. 2, there are two planet gears 46 spaced 180° apart although, in the alternative, three planet gears can be spaced at 120° intervals, four planet gears spaced at 90° intervals, etc. Planet gears 46 mesh with ring gear 48 which extends in a circle about planet gears 46 and defines the outer bounds of the "orbit" of the planet gears.

Ring gear 48 is connected by a one-way clutch 50 to a generally cylindrical portion of frame 26 to prevent, for example, counterclockwise rotation (as seen from the right end of FIG. 2) of ring gear 48 relative to frame 26. Clutch 50 may be a common automatic actuating type of clutch such as a roller cam clutch.

Roller cam clutch 50 includes one or more rollers 52 disposed between an outer ring 54 and an inner ring 56. Although not shown in FIG. 2, one of rings 54 or 56 (usually outer ring 54) has cams projecting toward roller 52 which are shaped so as to allow ring 56, which is fixed to ring gear 48, to rotate in a clockwise direction (viewed from the right end of FIG. 2) relative to ring 54, which is fixed to housing 26. The cams lock rings 54 and 56 together if ring 56 attempts to rotate in a counterclockwise direction relative to ring 54. The details of the cam surface shapes are not shown or discussed since the particulars of one-way clutch 50 are not a part of the present invention. Generally, clutches other than roller cam clutches might be used to ensure one-way rotation of ring 56, but the advantages of the present invention will be most readily realized by a roller cam one-way clutch because it is automatically engaged and disengaged directly by relative motion of the parts to which it is attached.

Mounted on one side of inner ring 56 is a second one-way clutch 58 which may be realized in the same fashion as one-way clutch 50. One-way clutch 58 couples ring gear 48 to a planet carrier 60 by way of ring 56. One-way clutch 58 overruns or free-wheels when planet carrier 60 is moving clockwise (viewed from the right end of FIG. 2) relative to ring gear 48 during the engine cranking/starting mode (i.e., machine 28 acting as a cranking/starting motor). Plante carrier 60 includes shafts 62 upon which planet gears 46 rotate a locking collar 64 that secures the planet carrier to engine crankshaft 40 by locking pins 66. Motor shaft 34 has an end 68 within the locking collar 64 and separated from the locking collars by bearings 70.

Figure 3:
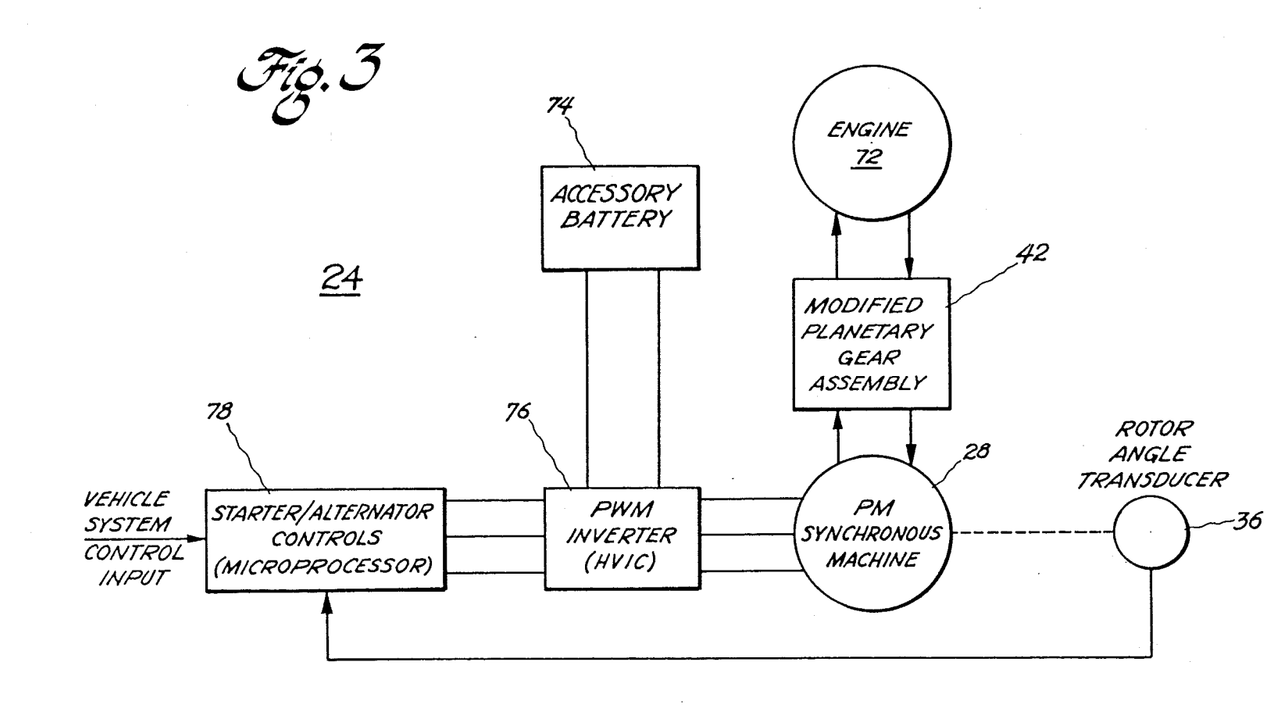
FIG. 3 is a block diagram illustrating the control circuits for the engine starter system of the present invention.

FIG. 3 is a simplified block diagram of the electromechanical components of FIG. 2 and the electrical controls used with the present system 24. In particular, the modified planet gear assembly 42 is shown disposed between permanent magnet synchronous machine 28 and an engine 72 having the crankshaft 40 of FIG. 2. During the engine cranking/starting mode, permanent magnet synchronous machine 28 is powered by a battery 74 through a current controlled pulse width modulation inverter 76 which, in turn, is controlled by starter/alternator controls 78, preferably including a microprocessor receiving input signals from rotor angle transducer 36 of FIG. 2. Starter/alternator controls 78 issue appropriate switching commands to the power semiconductors in inverter 76. In the cranking/starting mode, controls 78 issue commands to the inverter that cause the inverter to provide AC excitation to the stator of synchronous machine 28, based on the rotor position obtained from rotor angle transducer 36, such that the machine produces positive torque over a wide speed range. The rotor angle transducer and the controls perform a function analogous to that performed by the commutator in a DC machine.

In the engine run mode, controls 78 issue commands to inverter 76 that cause the inverter to apply AC excitation to the stator of synchronous machine 28 such that the machine produces a negative torque and regenerates DC power back into battery 74. In this mode, controls 78 and inverter 76 operate as a controlled rectifier bridge that converts AC power from the machine terminals to DC power. Conventional automotive alternators employ an internal (uncontrolled) diode rectifier bridge, typically six diodes in a 3-phase bridge configuration. In order for such uncontrolled rectifier bridge to regenerate DC power back into the battery, the machine terminal voltage amplitude must exceed the battery voltage. Hence conventional alternators operate at higher speeds than the engine crankshaft via belt/pulley gearing in order to provide sufficient machine terminal voltage and thus regenerate DC power into the battery during engine idle. A unique advantage of the controls, inverter and AC machine (whether a synchronous permanent magnet machine, switched reluctance machine or induction machine) of this invention is the ability to generate DC power back into the battery at relatively low machine speeds, where the terminal voltage of the machine is less than the battery voltage. This permits operation of the starter/alternator machine at crankshaft speed (direct drive) during engine run mode, with capability to regenerate DC power back into the battery even at engine idle speed.

As engine speed varies, starter/alternator controls 78 vary the inverter commands to provide the proper DC voltage regulation at the battery. Advantageously, a conventional voltage regulator (whether mounted internal or external to the alternator) is not required in this invention.

While rotor angle transducer 36 combines with controls 78 for synchronous machine 28 to perform a function analogous to that performed by the commutator in a DC machine, rotor angle transducer 36 can be replaced by a speed transducer or an electrically-derived signal if the starter/generator machine is an induction machine instead of a synchronous machine. Although the permanent magnet synchronous machine is of higher efficiency than the induction machine, an induction machine can be a suitable lower cost alternative.

An additional advantage provided by the starter/alternator controls of the invention, and not readily obtainable with conventional starter and alternator systems, is more intelligent management of electrical energy. For example, the controls of the invention permit varying the engine cranking/starting torque profile as a function of ambient temperature and/or engine temperature, and provide capability to reduce alternator output power during peak vehicle accelerations.

Figure 4:
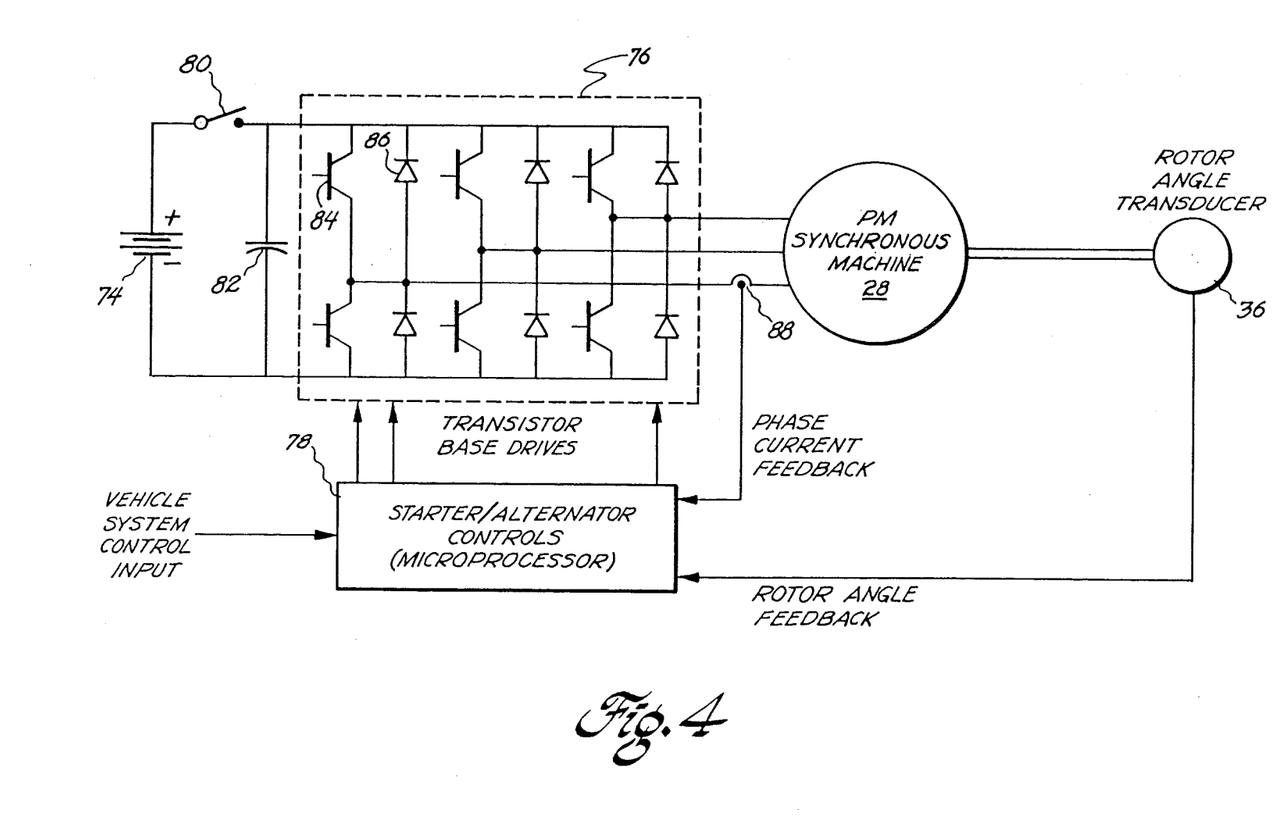
FIG. 4 is a simplified combined schematic and block diagram illustrating the control circuits of the engine starter system of FIG. 3 in greater detail.

FIG. 4 is a simplified schematic diagram of inverter 76 and several other components shown in FIG. 3. Battery 74 is connected by a switch 80 to a DC link capacitor 82. (Those skilled in the art will appreciate that switch 80 can be eliminated if low leakage power semiconductors are employed in inverter 76.) Inverter 76, as shown, is a current controlled three-phase inverter which includes six power semiconductors that, in this instance, comprise transistors 84, and six diodes 86, each of the diodes being positioned in parallel with a separate transistor 84, respectively, to protect the respective separate transistor against passage of reverse current therein. The inverter supplies three-phase power to synchronous machine 28 when the machine is operating as a cranking/starting motor. One or more current sensors 88 (only one being shown) may be used to provide current feedback to maintain accurate control of the current in each of the motor phase windings in known fashion. Inverter 76 may include a high voltage integrated circuit (HVIC) chip which performs various logic and inverter drive functions and may operate at high voltages.

A portion of starter/alternator controls 78 and PWM inverter 76 may be implemented by the HVIC based Five Horsepower Drive Control, GE Model 8794705BX, available from GE Motor Business, Fort Wayne, Ind. Alternator inverter power semiconductors include the MOS Controlled Thyristor (or MCT), such as described and claimed in V.A.K. Temple Application Ser. No. 707,309, filed Mar. 1, 1985, and assigned to the instant assignee, which is a continuation of abandoned Application Ser. No. 391,620, filed June 24, 1982, which is a continuation-in-part of abandoned Application Ser. No. 331,049, filed Dec. 16, 1981, as well as Field Effect Transistors and Insulated Gate Transistors (or IGTs). Battery 74 may, if desired, be of a higher voltage than the usual 12 volts typically employed in motor vehicle applications, thereby reducing the required current rating of the inverter power semiconductors.

Phase current sensors 88 may comprise discrete devices, such as Hall effect current sensors, in series with the individual phase windings of the motor. Alternatively, inverter 76 may employ pilot current sensor elements built into switching transistors 84 as disclosed in J. P. Walden and E. J. Wildi U.S. patent application Ser. No. 892,739, filed July 31, 1986 as a file wrapper continuation of Ser. No. 529,240, filed Sept. 6, 1983, or as in the manner employed in T. M. Jahns and E. J. Wildi U.S. patent application Ser. No. 140,686 filed Jan. 4, 1988, all of which are assigned to the instant assignee.

Operation

With reference to FIGS. 2, 3, and 4, operation of the present system 24 is described. Upon an attempt to turn on engine 72, microprocessor 78 goes into a start mode, switching transistors 84 so as to provide three-phase AC power to synchronous machine 28. Rotor 30 of synchronous machine 28 starts rotating as a result of application of power to stator 32.

Unlike conventional engine starter systems that draw exceedingly high DC current from the battery at the instant engine cranking begins, the present system, using the inverter and AC synchronous (or induction) machine draws considerably less DC current from the battery when it initially begins to crank the engine. Conventional starter systems require a solenoid switch of high current capacity to connect the battery directly to a series DC machine. In the present system, the DC battery current for rated torque with locked rotor can typically be an order of magnitude less than in the conventional system. At locked rotor, the inverter produces rated AC motor current while requiring a small DC input current sufficient only to overcome losses in the inverter and motor. As speed of the cranking/starter motor increases from zero, the motor output power increases and therefore DC input current to the inverter also increases. However, the AC drive system, being of higher efficiency than a conventional starter system, requires less current to be drawn from the battery to crank/start the engine in comparison to the conventional starter system. Accordingly, battery 74 may be of lower capacity than required for a conventional starter system or, alternatively, battery 74 can power a greater number of accessories during the starting operation.

As microprocessor 78 switches transistors 84 to convert DC power from battery 74 into AC power being fed to synchronous machine 28, phase current feedback from current sensor 88 and rotor angle feedback from transducer 36 are monitored by the microprocessor to ensure proper switching action in known fashion. Motor shaft 34 begins turning clockwise (as seen from the right side of FIG. 2 and indicated by the arrow) and sun gear 44, which is preferably integral with shaft 34 (or at least mounted thereon), likewise turns in a clockwise direction. This causes planet gears 46 to rotate in a counterclockwise direction as they "orbit" and produces a reaction torque on ring gear 48. However, the tendency of ring gear 48 to rotate is prevented by one-way clutch 50 locking ring gear 48 against counterclockwise rotation relative to starter frame 26. The "orbiting" of planet gears 46, therefore moves planet carrier 60 clockwise by way of the planet gear mounting shafts 62. Planet carrier 60 is free to rotate clockwise relative to ring gear 48 because one-way clutch 58 is, at that time, overrunning (i.e., freely turning). Thus the planet carrier turns engine crankshaft 40 clockwise when cranking/starting the engine. The torque supplied to the engine crankshaft is equal to the torque of permanent magnet synchronous machine 28 multiplied by the gear ratio. The gear ratio should desirably be between 3:1 and 12:1. For example, if the gear ratio is 10:1 and the engine requires 150 foot-pounds of torque for cranking/starting purposes, synchronous machine 28 must generate 15 foot-pounds (ignoring losses) to provide the required 150 foot-pounds at engine crankshaft 40. The gear ratio in this cranking/starting mode is:

$$N_r/N_s)+1$$

where $N_s$ is equal to the number of sun gear teeth and $N_r$ is equal to the number of ring gear teeth.

During the cranking/starting mode, microprocessor 78 allows synchronous machine 28 to provide positive torque to engine 72 through the modified planetary gear assembly 42. When the microprocessor detects starting of the engine by way of an engine start signal, which may be generated as the result of an abrupt jump in crankshaft revolution rate, for example, or in any other manner commonly used for some modern engines, the microprocessor changes inverter 76 from its start mode to a run mode corresponding to a negative torque from synchronous machine 28. That is when synchronous machine 28 begins receiving torque from engine 72 through the modified planetary gear assembly. In this run mode, crankshaft 40 turns in a clockwise direction, thereby turning planet carrier 60 clockwise. One-way clutch 50 now overruns, such that ring gear 48 is no longer locked to starter frame 26. One-way clutch 58 becomes locked or engaged when the speed of ring gear 48 would otherwise exceed the speed of planet carrier 50 such that ring gear 48 is now locked to, and moves clockwise with, planet carrier 60. Effectively, this locks all of the planet gears 46 to sun gear 44 and to ring gear 48, such that engine crankshaft 40 is directly coupled to synchronous machine shaft 34. Shaft 34 and crankshaft 40 then rotate at the same speed, and with the same torque. At that time, the effective gear ratio between the engine crankshaft and the synchronous machine shaft is 1:1. During this synchronous machine negative torque condition, corresponding to the run mode, microprocessor 78 triggers inverter 76 such that AC power generated by synchronous machine 28 is delivered as DC power to battery 74.

System efficiency of a properly designed permanent magnet synchronous machine and pulse width modulated inverter operating as an alternator and controlled rectifier is typically 80%–90%, as compared to conventional systems that range from 38%–60%. Higher efficiency allows increased DC output power to charge the battery for a machine of any given size. Therefore with the same size machine, considerably more output power is available, or if the same amount of output power is desired, machine 28 in the instant invention can be considerably smaller than the machine of the conventional system. Since machine 28 in the instant invention operates at crankshaft speed in this mode, parasitic losses of the belt and pulleys are eliminated. Improved efficiency is achieved through less loss, and therefore less cooling is required. (Consequently, the fan for cooling the machine may either be eliminated or reduced in size.) Parasitic losses at high operating speeds, due to fan losses, are also thereby reduced.

It will be appreciated that the modified planetary gear assembly 42 provides for high torque gain when synchronous machine 28 is cranking/starting the engine. In that mode, ring gear 48 is stationary so that the planetary gear assembly operates with the gear ratio indicated by the formula above. However, when the system is in the run mode, modified planetary gear assembly 42 provides direct coupling between engine crankshaft 40 and synchronous machine shaft 34. Accordingly, the planetary gear assembly design can be optimized to provide the necessary torque multiplication in the start mode while ensuring a 1:1 gear ratio when in the run mode. Little or no gear wear occurs during the run mode because the gears are effectively locked together (i.e., some of their teeth are meshed, but no teeth are moving into and/or out of contact with other teeth).

Inverter 76 may be designed such that the current which it handles is of about the same magnitude irrespective of whether the system is in the run mode or start mode. This is possible because, among other reasons, the torque multiplication isused in the start mode, but not in the run mode. Machine 28 is preferably designed to operate near its maximum speed and power ratings in both cranking/starting and alternator/generator modes.

Although the present description has included various specific details, it is to be understood that these are for illustrative purposes only. Various modifications and adaptations will be readily apparent to those of skill in the art. For example, an alternative to the design of FIG. 2 could employ a high powered dynamoelectric machine and modified planetary gear assembly which is oil-cooled and packaged in a transmission. Accordingly, the scope of the present invention should be determined by reference to the claims appended hereto.

What is claimed is:

1. A system for engine cranking/starting and for providing electrical power during engine operation, comprising:
   a dynamoelectric machine having a shaft, a rotor mounted to said shaft, and a stator;
   a combustion engine having rotatable means adapted to be rotated by said machine when the engine is to be started and further adapted to be rotated by the engine during engine operation; and
   a gear assembly connecting said shaft to said rotatable means, said gear assembly comprising a first clutch and a second clutch;
   said system being operable in:
   I. a start mode in which rotation of said rotor is initiated and maintained in rotation in a given direction by application of electrical energy to said stator such that said dynamoelectric machine operates as a motor and drives said rotatable means through said gear assembly, such that said first clutch responds to being driven by said machine by engaging in the start mode and said second clutch responds to being driven by said machine by disengaging in the start mode, said gear assembly having a gear ratio to provide torque multiplication in the start mode; and
   II. a run mode in which said rotatable means drives said rotor in said given direction through said gear assembly such that said dynamoelectric machine operates as a generator with said stator supplying electrical power, such that said second clutch responds to being driven by said rotatable means by engaging in the run mode and said first clutch responds to being driven by said rotatable means by disengaging in the run mode, said gear assembly having a gear ratio in the run mode which is different than its gear ratio in the start mode.

2. The system of claim 1 wherein said first clutch is a one-way clutch.

3. The system of claim 2 wherein said second clutch is a one-way clutch.

4. The system of claim 1 wherein said gear assembly further comprises a plurality of gears which are locked together in the run mode.

5. The system of claim 4 wherein said plurality of gears of said gear assembly includes a sun gear coupled to said rotor, at least a first planet gear meshing with said sun gear, and a ring gear meshing with said first planet gear, said gear assembly further including a planet carrier having a mount upon which the planet gear rotates.

6. The system of claim 5 wherein said dynamoelectric machine includes a housing, and wherein said first clutch is operable in the start mode to hold said ring gear stationary relative to said housing and is operable in the run mode to allow said ring gear to rotate relative to said housing.

7. The system of claim 6 wherein said second clutch is operable in the start mode to allow rotation of said planet carrier relative to said ring gear and is operable in the run mode to lock said ring gear to said planet carrier.

8. The system of claim 7 wherein both said first clutch and said second clutch are one-way clutches.

9. The system of claim 1 wherein said gear assembly provides a 1:1 gear ratio in the run mode.

10. A system for engine cranking/starting and for providing electrical power during engine operation comprising:
    an electronically commutated dynamoelectric machine having a shaft and a housing;
    a battery coupled to said machine and to an inverter;
    a combustion engine having rotatable means adapted to be rotated by said machine when the engine is to be started and further adapted to be rotated by the engine during engine operation; and
    a gear assembly comprising a first clutch and a plurality of gears connecting said shaft to said rotatable means, said plurality of gears including a sun gear operable to rotate with said shaft, a planet gear meshed to said sun gear, and a ring gear meshing with said planet gear, said gear assembly further including a planet carrier having a mount upon which said planet gear rotates;
    said system being operable in:
    I. a start mode in which said dynamoelectric machine operates as a motor and drives said rotatable means through said gear assembly, said first gear moves in a given direction to drive said second gear, and said gear assembly provides a first predetermined gear ratio for torque multiplication, said first clutch being operable in said start mode to hold said ring gear stationary relative to said housing, said inverter being powered by said battery in the start mode to supply AC power to said machine; and
    II. a run mode in which said dynamoelectric machines operates as an AC generator and is driven by said rotatable means through said gear assembly, said first gear is driven in the given direction by said second gear, and said gear assembly provides a second predetermined gear ratio different than said first predetermined gear ratio, said first clutch being operable in said run mode to allow said ring gear to rotate relative to said housing, said inverter being operable in said run mode to receive AC power from said machine and to change said battery.

11. The system of claim 10 wherein said dynamoelectric machine comprises a synchronous permanent magnet dynamoelectric machine.

12. The system of claim 10 including a second clutch operable in the start mode to allow rotation of said planet carrier relative to said ring gear and operable in the run mode to lock said ring gear to said planet carrier.

13. The system of claim 12 wherein said first and second clutches comprise one-way clutches.

14. The system of claim 10 wherein said sun and planet gears are locked together in said run mode.

15. The system of claim 10 wherein said dynamoelectric machine comprises an induction machine.

16. The system of claim 10 wherein said dynamoelectric machine comprises a switched reluctance machine.

17. A system for engine cranking/starting and for providing electrical power during engine operation comprising:
an electronically commutated dynamoelectric machine having a shaft and a housing;
a combustion engine having rotatable means adapted to be rotated by said machine when the engine is to be started and further adapted to be rotated by the engine during engine operation; and
a gear assembly coupled to said shaft and said rotatable means, said gear assembly including a sun gear, at least a first planet gear meshing with said sun gear, a ring gear meshing with said first planet gear, and a planet carrier having a mount upon which said first planet gear rotates, said gear assembly further comprising a first clutch and a second clutch;
said system being operable in:
I. a start mode wherein said dynamoelectric machine operates as a motor and drives said sun gear to operate said gear assembly and thereby drive said rotatable means for starting the engine, said first clutch being operable in the start mode to hold said ring gear stationary relative to said housing, said second clutch being operable in the start mode to allow rotation of said planet carrier relative to said ring gear, said gear assembly providing a first predetermined gear ratio for torque multiplication in said start mode; and
II. a run mode wherein said dynamoelectric machine operates as a generator and is driven by the rotatable means through said gear assembly, said first clutch being operable in the run mode to allow said ring gear to rotate relative to said housing, said second clutch being operable in the run mode to lock said ring gear to said planet carrier, said gear assembly having a second predetermined gear ratio in the run mode which is different than said first predetermined gear ratio.

18. The system of claim 17 wherein said sun gear is disposed on said shaft and said gear assembly further includes a second planet gear.

19. The system of claim 17 wherein both said first and second clutches are one-way clutches.

20. The system of claim 17 wherein said dynamoelectric machine includes a housing and said gear assembly includes first and second clutches, said first clutch being engaged in the start mode so as to hold said ring gear stationary relative to said housing and being disengaged in the run mode to allow said ring gear to rotate relative to said housing, said second clutch being disengaged in the start mode to allow rotation of said planet carrier relative to said ring gear and engaged in the run mode to lock said ring gear to said planet carrier, and both said first and second clutches being one-way clutches.

21. The system of claim 17 wherein said machine comprises a permanent magnet synchronous dynamoelectric machine having a rotor mounted to said shaft and having a stator, said rotor being started and maintained in rotation in a given direction by application of electrical energy to said stator during said start mode, said rotor rotating in said given direction and said stator making available electrical power during said run mode.

* * * * *